United States Patent [19]

Shibata et al.

[11] Patent Number: 5,098,562
[45] Date of Patent: Mar. 24, 1992

[54] APPARATUS FOR TREATING DEAERATED WATER

[76] Inventors: Yoshihiko Shibata, 83-11, Matsushin, Okayama-Shi, Okayama-Ken 704; Yoshihiro Chikamori, 6-16, Numa, Okayama-Shi, Okayama-Ken 709-08; Youichi Shimizu, 348-7, Otami, Okayama-Shi, Okayama-Ken 703, all of Japan

[21] Appl. No.: 647,320

[22] Filed: Jan. 29, 1991

[51] Int. Cl.⁵ .............................................. B01D 19/00
[52] U.S. Cl. .................................... 210/188; 210/266; 210/269; 210/321.76; 210/321.85; 55/158
[58] Field of Search .......... 210/638, 640, 188, 321.76, 210/321.85, 266, 269; 55/159, 16, 158

[56] References Cited

U.S. PATENT DOCUMENTS

| | | | |
|---|---|---|---|
| 1,690,564 | 11/1928 | Ward | 210/441 |
| 1,693,717 | 12/1928 | Lienesch | 210/441 |
| 3,037,637 | 6/1962 | Bub | 210/441 |
| 3,238,056 | 3/1966 | Pall et al. | 210/505 |
| 3,397,790 | 8/1968 | Newby et al. | 55/158 |
| 3,573,158 | 3/1971 | Pall et al. | 210/505 |
| 3,668,837 | 6/1972 | Gross | 55/158 |
| 4,177,149 | 12/1979 | Rosenberg | 210/436 |
| 4,218,317 | 8/1980 | Kirschmann | 210/449 |
| 4,326,957 | 4/1982 | Rosenberg | 210/436 |
| 4,545,862 | 10/1985 | Gore et al. | 210/640 |
| 4,591,439 | 5/1986 | Grot | 210/638 |
| 4,647,380 | 3/1987 | Dasgupta | 210/638 |
| 4,683,039 | 7/1987 | Twardowski et al. | 210/640 |
| 4,787,980 | 11/1988 | Ackermann et al. | 210/638 |
| 4,789,480 | 12/1988 | Bruschke | 55/158 |
| 4,816,161 | 3/1989 | Olness et al. | 210/638 |
| 4,911,840 | 3/1990 | Underwood | 210/266 |
| 4,913,817 | 3/1990 | Tsushima et al. | 210/500.27 |
| 4,936,985 | 6/1990 | Hahn | 210/266 |
| 4,976,866 | 12/1990 | Grinsted et al. | 210/266 |

*Primary Examiner*—Stanley S. Silverman
*Assistant Examiner*—Cynthia L. Nessler

[57] ABSTRACT

A water treating apparatus is provided with a softening section, including an ion-exchange resin-filled section and a softening section disposed integrally with a vacuum deaerating membrane section so as to allow gases to pass through the membrane while a liquid is prevented from passing therethrough. The apparatus is compact in size and easily handled. The softened water provided thereby is useful as deionized and degassed water for boiler water and for the preparation of integrated circuits.

3 Claims, 1 Drawing Sheet

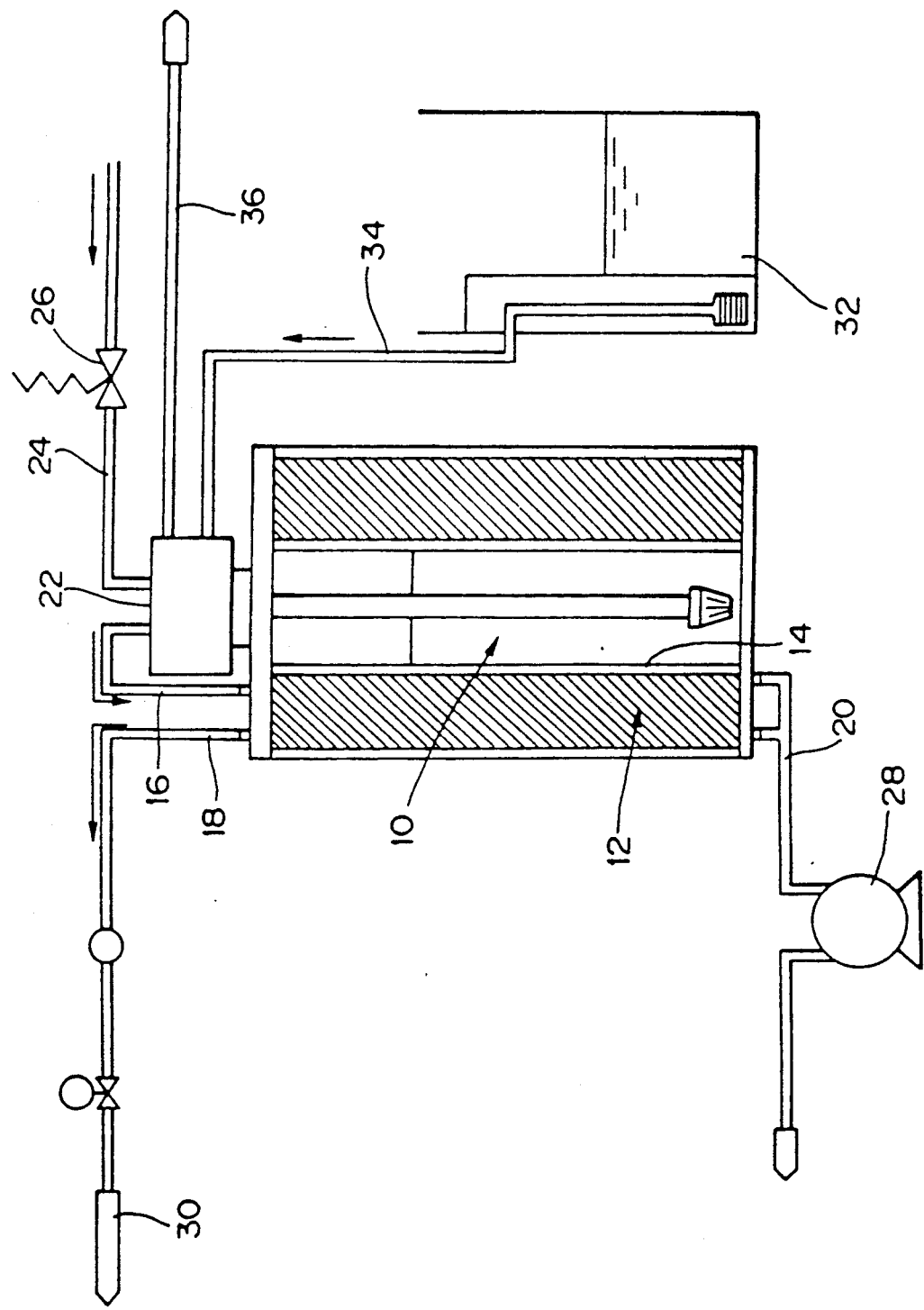

APPARATUS FOR TREATING DEAERATED WATER

FIELD OF THE INVENTION

The present invention relates to a water treating apparatus and, more particularly, to a water treating apparatus capable of readily producing deionized and deaerated or degassed water to be employed for boiler water or for the preparation of integrated circuits from tap water or underground water.

BACKGROUND OF THE INVENTION

There are known a variety of processes for the preparation of deionized and deaerated water which include processes using an ion-exchange resin column, a decarbonator, a vacuum deaerator including vacuum deaerators of the membrane type, and a deoxygenating agent. Also known are various apparatus for use with those known processes.

As conventional processes for preparing deionized and deaerated water to be employed as boiler water, there is known technology involving the use of an ion-exchange resin for deionization and use of a deoxygenating agent for deaeration, technology involving the use of an ion-exchange resin for deionization and the use of a heating deaerator, and technology involving the use of a reverse osmosis membrane for deionization and the employment of a vacuum deaerator of a membrane type for deaeration. The technology using the ion-exchange resin and the deoxygenating agent presents problems of achieving a sufficient degree of deaeration, the requirement of a boiler compound, and the fact that this process requires multiple steps. The technology involving the employment of the ion-exchange resin and the heating deaerator suffers from the difficulties that it requires the use of a boiler compound as well as high temperatures and high pressures, thereby making the instrument large in size. Further, the technology using a vacuum deaerator has the problem that a high-pressure pump for feeding a liquid is required for the reverse osmosis membrane.

Further, as conventional processes for the preparation of deionized and deaerated water, there are known processes using an ion-exchange resin and a reverse osmosis membrane for deionization and a vacuum deaerator for deaeration. These processes, however, suffer from the difficulty that an apparatus of large size is required in both cases.

As described above, the conventional processes and apparatus for use with those processes have problems such as performing deaeration to a less sufficient extent or requiring an apparatus of a size larger than necessary because they are each a continuous combination of individual steps.

SUMMARY OF THE INVENTION

The present invention comprises a water treating apparatus having a water passage, including an extraneous ion-removing section and a degassing section, wherein the water passage defined by the degassing section is formed by a waterproof, air-permeable membrane and the space defined by the waterproof, air-permeable membrane is disposed to allow the pressure within the space to be reduced.

The water treating apparatus for the preparation of deionized and deaerated water according to the present invention is of a type in which the ion-removing section is integral with the degassing section. The ion-removing section comprises an ion-exchange resin which does not require a high pressure pump, unlike a reverse osmosis membrane or the like. The water treating apparatus according to the present invention further enables regeneration of the resin to be carried out on a regular basis by a salt water vessel connected to the apparatus. The regeneration of the resin is essential for use over a long period of time. The degassing section includes a vacuum deaerating or degassing membrane which will allow a high degree of deaerating or degassing performance to be achieved without the requirements of high temperatures and high pressures. Further, in making the ion-removing section integral with the degassing section, the ion-exchange resin section is so arranged as to form a central core of cylindrical shape and the degassing section of membrane type is of a spiral module shape, so arranged as to be peripherally wound around the ion-exchange section.

In order to prevent a flow of the treating water into the degassing section made of the ion-exchange resin, the water treating apparatus according to the present invention is provided with a filter and has the deaerating or degassing membrane arranged to maintain its deaerating or degassing performance with high efficiency. The membrane may be reinforced with a nonwoven cloth or a woven cloth to improve its durability or is enabled to withstand waste water by coating it with a silicone resin.

The water treating apparatus according to the present invention is constructed to be identical with an ion-exchange resin column of a spiral membrane type of compact structure and high durability. Further, it can be operated with ease.

BRIEF DESCRIPTION OF THE DRAWING

The FIGURE is a diagrammatic representation of a water treating system containing the water treating apparatus according to the present invention.

DETAILED DESCRIPTION OF THE INVENTION

The present invention will be described in more detail by examples in conjunction with the accompanying drawing.

The FIGURE illustrates an embodiment of the water treating apparatus according to the present invention which comprises an ion-exchange resin section 10 and a degassing membrane section 12. The ion-exchange resin section 10 is filled with an ion-exchange resin. The degassing membrane section 12 is composed of a waterproof, air-permeable membrane which in turn is disposed such that one surface thereof forms and defines a water passage and the opposite surface thereof forms and defines a gas passage, each of the passages being defined by a spacer 14. The waterproof, air-permeable membrane and the spacer 14 are spirally connected to each other, and the water passage communicates with a soft water inlet 16 to the degassing membrane section 12 and with a degassed soft water outlet 18 therefrom. The gas passage communicates with a gas outlet 20.

The ion-exchange resin to be employed for the ion-exchange resin section 10 may be any conventional ion-exchange resin as long as it is appropriate to be employed in accordance with the nature of the water to be treated. The ion-exchange resins include cationic exchange resins, such as a cross-linked resin into which an anionic group, for instance a sulfonate group, a carboxylate group, a hydroxyl group, or the like is introduced, an anionic-exchange resin, such as a cross-linked resin into which an amino group or an ammonium group is introduced, or a mixture thereof. The ion-exchange resins may be in any shape including powders, granules, films, or the like.

The waterproof, air-permeable membrane to be employed for the present invention may be a porous membrane or film composed of a water-repellent material, through which a liquid such as water cannot be permeated and gases such as oxygen, nitrogen, or the like are adequately permeable. The film may be composed of, for example, expanded polytetrafluoroethylene, of a thickness ranging from 0.005 mm to 3 mm, a pore size ranging from 0.01 micron to 5 microns, and a porosity ranging from 5% to 95%.

The water treating apparatus may be composed of a material for general use, such as glass, iron, stainless steel, plastics or the like.

EXAMPLE

The water treating apparatus used in this Example is such that hard water is arranged to enter the ion-exchange resin section 10 through a control valve 22 into which hard water is supplied through a hard water passage 24 The amount of hard water to be supplied to the control valve 22 is adjusted by a valve 26 disposed on the hard water passage 24, and hard water supplied to the ion-exchange resin section 10 is subjected to ion-exchange, thereby converting the hard water into soft water. The softened water is then supplied by the control valve 22 to the degassing membrane section 12 through the soft water inlet 16. While the soft water supplied to the degassing membrane section 12 passes through a water passage disposed within the section 12 gases dissolved in the soft water are removed through the membrane or film by allowing the dissolved gases to be sucked into a gas passage, which in turn is in a reduced pressure state. The gases removed are discharged through the gas outlet 20 by means of a vacuum pump 28.

The soft water which has been degassed through the water passage within the degassing membrane section 12 is withdrawn from the section 12 and supplied through the degassed soft water outlet 18 to a boiler 30.

Also, the water treating apparatus used is arranged to allow the ion-exchange resin packed in the ion-exchange resin section 10 to be regenerated with salt water, which in turn is fed by the control valve 22 on a regular basis at predetermined intervals from a salt water tank 32 through a salt water passage 34.

In the FIGURE, reference number 36 denotes a drain.

The ion-exchange resin section 10 of the water treating apparatus, having the structure as shown in the FIGURE, was packed with 20 kg. of a cationic exchange resin powder. The ion-exchange resin section 10 was formed and defined by a waterproof, air-permeable film made of polytetrafluoroethylene of film thickness 50 microns, pore size 0.2 micron, porosity 80%, film width 0.5 meter, and total film area 25 sq. meters. The pressure within the degassing membrane section 12 disposed outside the ion-exchange resin section 10 was reduced to 60 Torr by the vacuum 20, pump 28. The floor area on which the apparatus has been disposed was as small as 0.20 sq. meter.

While the apparatus was kept in this state, hard water at 25° was poured through the hard water inlet 24 and the control valve 22 and subjected to ion-exchange within the ion-exchange resin section 10 and degassing treatment within the degassing membrane section 12 in the manner as described above.

The degassed soft water was measured for dissolved oxygen concentration and electrical conductivity. The dissolved oxygen concentration of the degassed soft water has been found to be reduced from 8.1 ppm to 0.3 ppm and the electric conductivity has been found to be lowered from 250 us/cm to 1.6 us/cm.

As described above, the water treating apparatus according to the present invention can be arranged to be compact in size and it can maintain to give high performance over a long period of time because it has the extraneous ion-removal section disposed to be integral with the degassing section.

Further, the test results as shown above reveal that the electric conductivity and the dissolved oxygen concentration of the degassed soft water can satisfy the levels required by boiler water for conventional small-size boilers having an electrical conductivity requirement of less than 3 us/cm and dissolved oxygen concentration requirement of less than 0.5 ppm. Further, it is noted that conventional apparatus which can satisfy the aforesaid requirements account for about 1.5 sq. meters of floor area when a softening device is used together with a device in which a deoxidizing agent is added and for about 1.3 sq. meters of floor area when a softening device is used together with a deaerating membrane device. Therefore, the apparatus according to the present invention requires 1/5 or less floor area and up to 1/10 of the total apparatus volume of conventional apparatus.

We claim:

1. A water treating apparatus having a water passage comprising an ion-removing section which contains material which removes ions from water and a degassing section, wherein:
    (a) the ion-removing section is disposed as a central core of said apparatus;
    (b) the degassing section comprises a waterproof, air-permeable membrane disposed such that one surface thereof forms and defines a water passage and the opposite surface thereof forms and defines a gas passage, each of said passages being defined by a spacer;
    (c) the waterproof, air-permeable membrane and the spacer being spirally connected to each other and spirally wound about said central core;
    (d) said water passage in said degassing section being connected to a soft water inlet from said ion-removing section to said degassing section and including an outlet for soft water emerging from said degassing section; and
    (e) said gas passage being connected to a gas outlet therefrom through which the pressure within said gas passage is reduced.

2. A water treating apparatus of claim 1 wherein said ion-removing section is filled with an ion-exchange resin and a filter for removing particles is mounted between said ion-removing section and said degassing section.

3. A water treating apparatus of claim 1 wherein said ion-removing section is connected to a salt water vessel disposed to supply salt water to said ion-removing section continuously to regenerate said ion-exchange resin.

* * * * *